United States Patent
Minagawa

(10) Patent No.: US 8,345,116 B2
(45) Date of Patent: Jan. 1, 2013

(54) NOISE REDUCTION FILTER PROCESSING CIRCUIT, IMAGE PROCESSING CIRCUIT, IMAGING DEVICE, AND STORAGE MEDIUM STORING NOISE REDUCTION PROGRAM

(75) Inventor: Takashi Minagawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 430 days.

(21) Appl. No.: 12/591,644

(22) Filed: Nov. 25, 2009

(65) Prior Publication Data

US 2010/0141782 A1 Jun. 10, 2010

(30) Foreign Application Priority Data

Dec. 4, 2008 (JP) ................................. 2008-309478

(51) Int. Cl.
*H04N 5/235* (2006.01)
*H04N 5/217* (2006.01)
*H04N 5/335* (2006.01)

(52) U.S. Cl. ...................... 348/222.1; 348/241; 348/273

(58) Field of Classification Search ............... 348/222.1, 348/224.1, 273, 241
See application file for complete search history.

(56) References Cited

U.S. PATENT DOCUMENTS

| 7,639,312 B2 * | 12/2009 | Baba et al. ..................... 348/790 |
| 7,893,974 B2 * | 2/2011 | Chiba ............................ 348/252 |
| 7,903,148 B2 * | 3/2011 | Yokoyama et al. ......... 348/222.1 |
| 2005/0140829 A1 * | 6/2005 | Uchida et al. ................. 348/625 |
| 2006/0055985 A1 * | 3/2006 | Ikeda ............................ 358/463 |
| 2007/0229675 A1 * | 10/2007 | Nishide ..................... 348/222.1 |

FOREIGN PATENT DOCUMENTS

JP A-2003-123063 4/2003

* cited by examiner

*Primary Examiner* — Trung Diep
(74) *Attorney, Agent, or Firm* — Oliff & Berridge, PLC

(57) ABSTRACT

A noise reduction filter processing circuit includes a first operating part calculating first saturation information indicative of a saturation of an input image, a nonlinear processing part performing nonlinear processing on the input image, a second operating part calculating second saturation information indicative of a saturation of the input image subjected to the nonlinear processing, and a correction operating part performing a correction operation on the input image subjected to the nonlinear processing using the first saturation information and the second saturation information.

5 Claims, 5 Drawing Sheets

NOISE REDUCTION FILTER PROCESSING CIRCUIT, IMAGE PROCESSING CIRCUIT, IMAGING DEVICE, AND STORAGE MEDIUM STORING NOISE REDUCTION PROGRAM

CROSS REFERENCE TO THE RELATED APPLICATIONS

This application is based upon and claims the benefit of priority from Japanese Patent Application No. 2008-309478, filed on Dec. 4, 2008, the entire contents of which are incorporated herein by reference.

BACKGROUND

1. Field

The present application relates to a noise reduction filter processing circuit, an image processing circuit, an imaging device, and a noise reduction program for reducing a color noise generated in an acquired image.

2. Description of the Related Art

Digital cameras mounting an image sensor consisting of a photoelectric conversion element, such as a CCD (Charge Coupled Device) or a CMOS (Complementary Metal-Oxide Semiconductor), are generally provided. In recent years, as the size of an image sensor is reduced or the pixel density of an image sensor is increased, the pixel pitch has been minimized, and a noise, such as a dark current noise or a photon shot noise of the image sensor, is generated significantly. The noise includes a point-like luminance noise generated in a luminance signal or a patchy color noise generated in a color signal. Among these noises, the color noise is a low frequency random noise which is a factor for causing degradation in the image quality. Therefore, a method for reducing the color noise in an image using a low pass filter is typically used (for example, refer to Japanese Unexamined Patent Application Publication No. 2003-123063).

However, when the color noise is reduced using a low pass filter, not only a deviation in a hue direction but also a deviation in a saturation direction is reduced. Specifically, when an image has color information wherein color information of each pixel is complementary with each other, in an image subjected to color noise reduction processing by a low pass filter, the color information of each pixel becomes similar to achromatic information, resulting in an image color different from the original image color.

SUMMARY

It is a proposition of the present application to provide a noise reduction filter processing circuit, an image processing circuit, an imaging device, and a noise reduction program that can reduce a color noise generated in an image with a simple configuration while maintaining a deviation of saturation.

In order to solve the above-described problem, a noise reduction filter processing circuit includes a first operating part calculating first saturation information indicative of a saturation of an input image, a nonlinear processing part performing nonlinear processing on the input image, a second operating part calculating second saturation information indicative of a saturation of the input image subjected to the nonlinear processing, and a correction operating part performing a correction operation on the input image subjected to the nonlinear processing using the first saturation information and the second saturation information.

Moreover, the nonlinear processing performed on the input image is median filter processing.

The first operating part calculates the first saturation information by adding an absolute value of a color difference obtained from the input image.

The second operating part calculates the second saturation information by adding an absolute value of a color difference obtained from the input image subjected to the nonlinear processing.

An image processing circuit includes the noise reduction filter processing circuit.

An imaging device includes the image processing circuit, an image sensor outputting an image signal based on received subject light, and a color converting part converting color information obtained from the image signal into luminance information and color difference information.

A computer-readable storage medium storing a noise reduction program causing a computer to execute a first operating step calculating a saturation of an input image as first saturation information, a nonlinear processing step performing nonlinear processing on the input image, a second operating step calculating a saturation of the input image subjected to the nonlinear processing as second saturation information, and a correction operating step performing a correction operation on the input image subjected to the nonlinear processing using the first saturation information and the second saturation information.

According to the present application, it is possible to reduce a color noise generated in an image while maintaining a deviation of the gradation of saturation.

DETAILED DESCRIPTION OF THE EMBODIMENT

Figure 1:
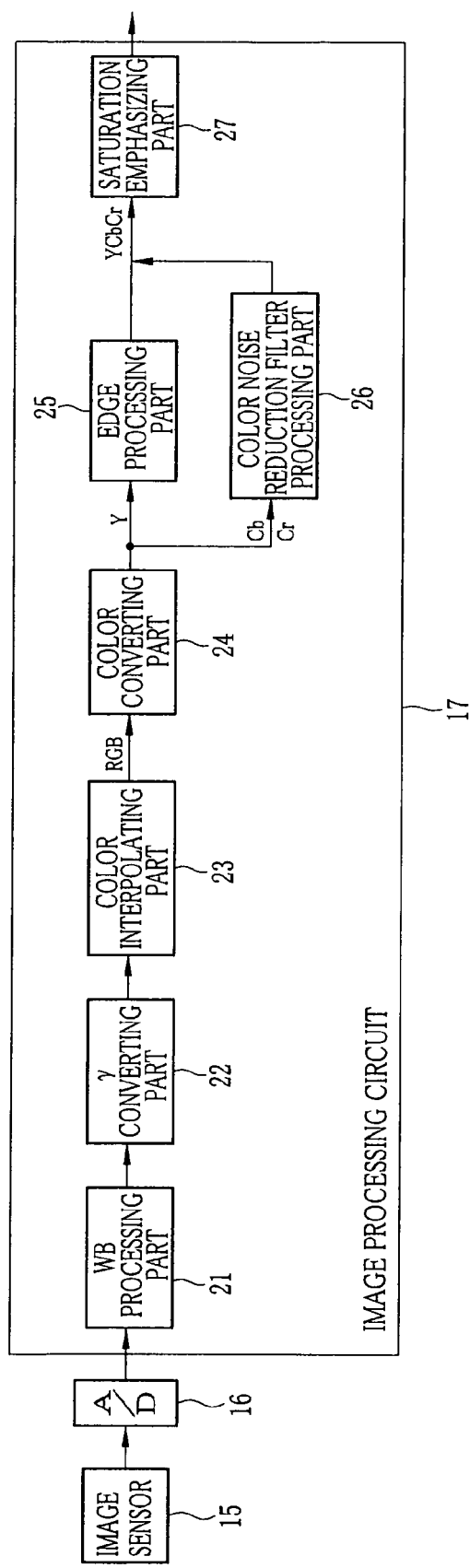
FIG. 1 is a functional block diagram showing a configuration of a digital camera.

FIG. 1 is a block diagram showing a configuration of a digital camera 10 according to the present embodiment. Note that, in FIG. 1, only a portion for processing an image signal output from an image sensor 15 to be described later is shown and other portions are omitted.

As the image sensor 15, a photoelectric conversion device, such as a CCD or a CMOS, is used. The image sensor 15 includes a filter array wherein a red (R) filter, a green (G) filter, and a blue (B) filter are disposed in a Bayer array, for example. The image sensor 15 photoelectrically converts the subject light passing through each of the R, G, and B filters of the filter array and accumulates these photoelectrically converted charges, respectively. The accumulated charges are output as an image signal from the image sensor 15. The image signal output from the image sensor 15 is input to an A/D converter 16, and is converted to a digital image signal from an analog image signal.

An image processing circuit 17 performs image processing on the input image signal. The image processing circuit 17 includes a white balance (WB) processing part 21, a γ converting part 22, a color interpolating part 23, a color converting part 24, an edge processing part 25, a color noise reduction filter processing part 26, and a saturation emphasizing part 27. The WB processing part 21 performs a WB adjustment on an image signal. The γ converting part 22 converts an input-output characteristic for an image signal subjected to the WB adjustment.

The color interpolating part 23 performs color interpolation processing on an image signal subjected to the γ conversion processing. Note that the image signal input to the color interpolating part 23 is an image signal including color information of any of R, G and B colors (i.e., color information of a single color component). The color interpolating part 23 performs color interpolation processing so that the color information of each pixel of an image signal is converted to the color information of each color component of R, G and B from the color information of a single color component of any of R, B and G The color converting part 24 converts the color information of an image signal. As described above, the color information obtained from an image signal after the color interpolation processing performed by the color interpolating part 23 is the color information including each color component of R, G and B. The color converting part 24 converts the color information obtained from an image signal into the color information including a luminance Y and color differences Cb, Cr from the color information of each color component of R, G and B. Among the image signals whose color information has been converted, a signal indicative of the luminance Y is output to the edge processing part 25 while signals indicative of the color differences Cb, Cr are output to the color noise reduction filter processing part 26. Hereinafter, the description is made referring the signal indicative of the luminance Y as a luminance signal Y, the signal indicative of the color difference Cb as a color difference signal Cb, and the signal indicative of the color difference Cr as a color difference signal Cr.

The edge processing part 25 performs edge emphasizing processing on an input luminance signal Y. The color noise reduction filter processing part 26 performs color noise reduction processing on the input color difference signal Cb and color difference signal Cr. The saturation emphasizing part 27 performs saturation emphasizing processing on an image signal including the luminance signal Y subjected to the edge emphasizing processing by the edge processing part 25, and the color difference signal Cb and color difference signal Cr subjected to the color noise reduction processing by the color noise reduction filter processing part 26. Note that, the saturation emphasizing processing in the saturation emphasizing part 27 is performed on an image signal including the luminance signal Y subjected to the edge emphasizing processing by the edge processing par 25, and the color difference signal Cb and color difference signal Cr subjected to the color noise reduction processing by the color noise reduction filter processing part 26, however, the present invention is not limited thereto, and the saturation emphasizing processing may be performed on an image signal before the edge emphasizing processing by the edge processing par 25 and the color noise reduction processing by the color noise reduction filter processing part 26 are performed.

Figure 2:
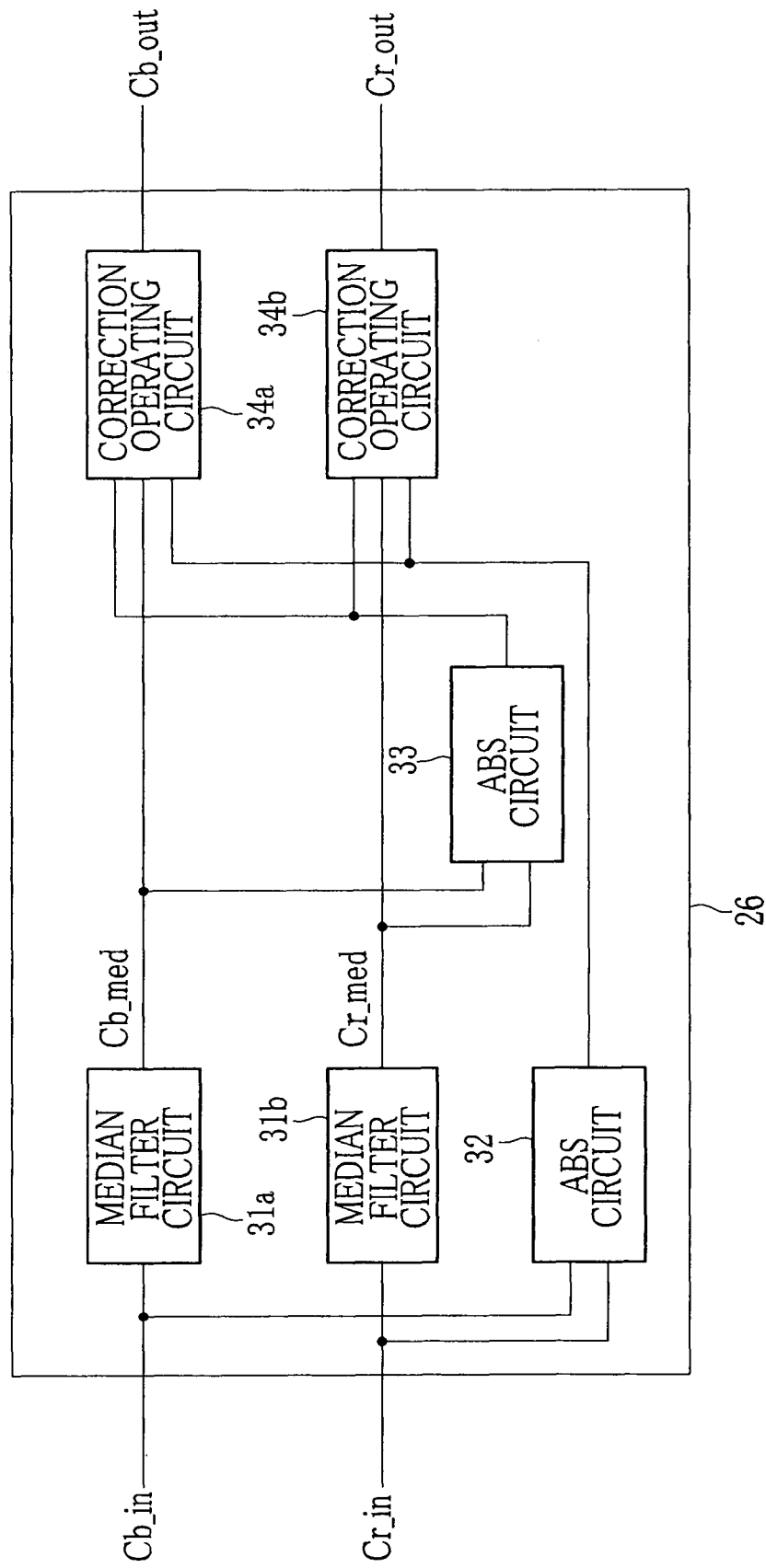
FIG. 2 is a functional block diagram showing a configuration of a color noise reduction filter processing part.

FIG. 2 shows a configuration of the color noise reduction filter processing part 26. The color noise reduction filter processing part 26 includes median filter circuits 31a, 31b, ABS circuits 32, 33, and correction operating circuits 34a, 34b.

Hereinafter, the color difference signal Cb and the color difference signal Cr input to the color noise reduction filter processing part 26 are referred to as a color difference signal Cb_in and a color difference signal Cr_in, respectively. Moreover, the color difference signal Cb and the color difference signal Cr output from the color noise reduction filter processing part 26 are referred to as a color difference signal Cb_out and a color difference signal Cr_out, respectively.

The median filter circuit 31a performs median filter processing on the color difference signal Cb_in. Similarly, the median filter circuit 31b performs the median filter processing on the input color difference signal Cr_in. Note that, since the median filter processing is well known, the detail thereof is omitted, but the median filter processing is a processing, wherein a color difference value that is a median value when pixels included in a certain area, such as a total of nine pixels of 3×3, are sorted according to the color difference value of each pixel, for example, is converted as the color difference value of a pixel at the center of the area. Hereinafter, the description is made referring the color difference signal Cb_in subjected to the median filter processing as a color difference signal Cb_med and the color difference signal Cr_in subjected to the median filter processing as a color difference signal Cr_med. Note that the pixels of a certain area used in the median filter processing are not limited to a total of nine pixels of 3×3.

The ABS (absolute) circuit 32 calculates a saturation value C_in of each pixel using the input color difference signal Cb_in and color difference signal Cr_in. If the color difference values obtained from the color difference signals Cb_in, Cr_in are denoted as $Cd_{Cb\_in}$, $Cd_{Cr\_in}$, then the saturation value C_in is calculated from Formula (1) below.

$$C\_in = |Cd_{Cb\_in}| + |Cd_{Cr\_in}| \tag{1}$$

Note that, the color difference values $Cd_{Cb\_in}$, $Cd_{Cr\_in}$ may take not only a positive value but also a negative value, and therefore in calculating the saturation value C_in the absolute values of the color difference values $Cd_{Cb\_in}$, $Cd_{Cr\_in}$ need to be calculated, respectively, and then be added together.

Moreover, the ABS circuit 33 calculates a saturation value C_med in each pixel from the color difference signal Cb_med and color difference signal Cr_med subjected to the median filter processing by the median filter circuits 31a, 31b, respectively. If the color difference values obtained from the color difference signal Cb and color difference signal Cr subjected to the median filter processing are denoted by $Cd_{Cb\_med}$ and $Cd_{Cr\_med}$, the saturation value C_med is calculated from Formula (2).

$$C\_med = |Cd_{Cb\_med}| + |Cd_{Cr\_med}| \tag{2}$$

Also in this case, as with Formula (1), the absolute values of the color difference values $Cd_{Cb\_med}$, $Cd_{Cr\_med}$ need to be calculated and added together.

Using the saturation value C_in, C_med output from the ABS circuits 32, 33, the correction operating circuit 34a performs correction operation processing on the color difference signal Cb_med after the median filter processing. Similarly, using the saturation value C_in, C_med output from the ABS circuits 32, 33, the correction operating circuit 34b performs the correction operation processing with respect to the color difference signal Cr_med after the median filter processing. For example, if the color difference values of the color difference signal Cb_out and color difference signal Cr_out subjected to the color noise reduction processing by the color noise reduction filter processing part 26 are denoted as $Cd_{Cb\_out}$, $Cd_{Cr\_out}$, these color difference values are calculated from Formula (3) and Formula (4).

$$Cd_{Cb\_out} = Cd_{Cb\_med} \times (C\_in/C\_med) \quad (3)$$

$$Cd_{Cr\_out} = Cd_{Cr\_med} \times (C\_in/C\_med) \quad (4)$$

As described above, the ABS circuit 32 calculates the saturation value C_in of each pixel from the input color difference signal Cb_in and color difference signal Cr_in while the ABS circuit 33 calculates the saturation value C_med of each pixel from the color difference signal Cb_med and color difference signal Cr_med after the median filter processing. Accordingly, the color difference values $Cd_{Cb\_med}$ and $Cd_{Cr\_med}$ of each pixel obtained from the color difference signal Cb_med and color difference signal Cr_med after the median filter processing are corrected for each pixel by the correction operating circuits 34a, 34b, respectively.

Figure 3:
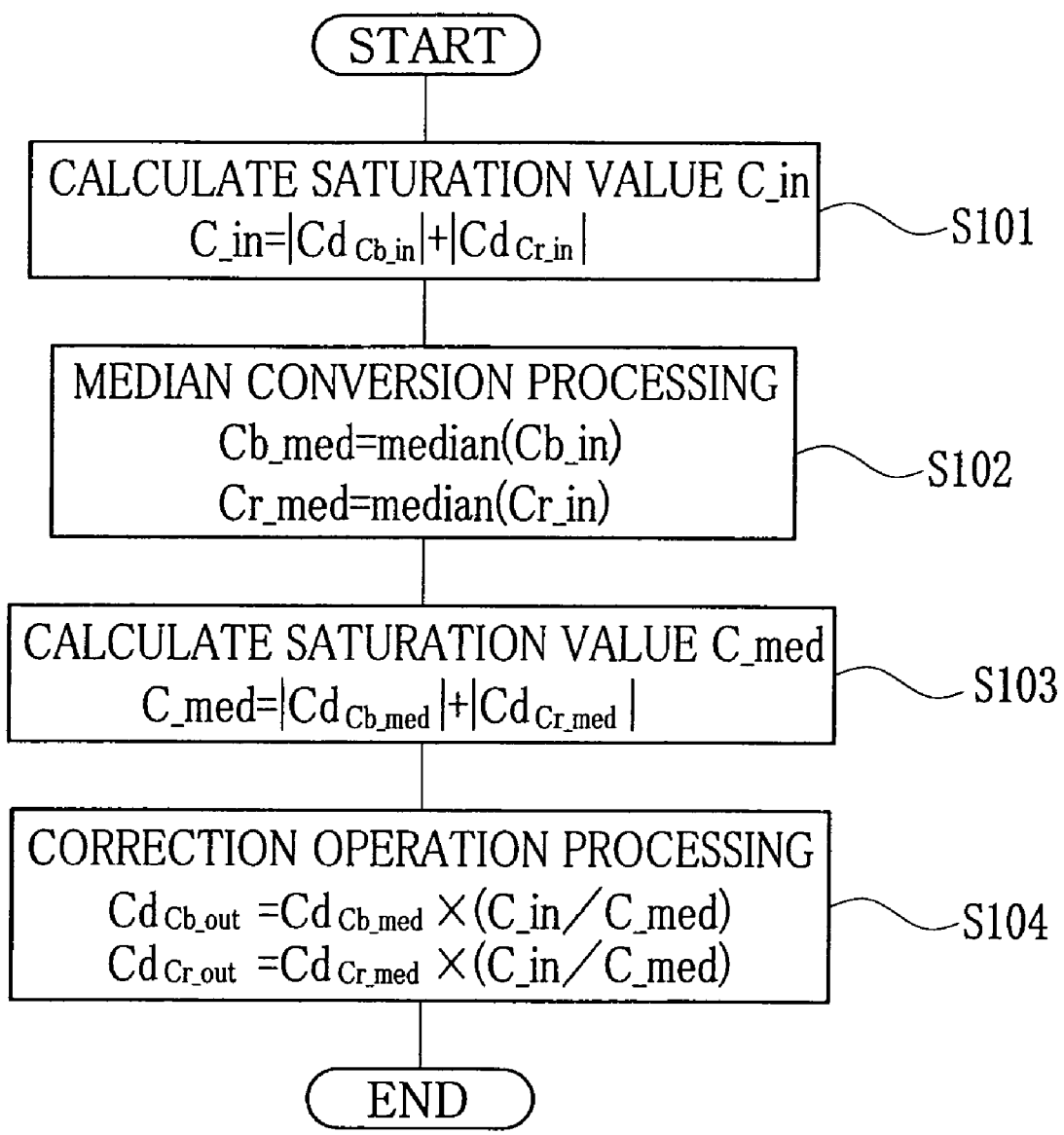
FIG. 3 is a flowchart showing a processing procedure in the color noise reduction filter processing part.

Next, a color noise reduction processing procedure by the color noise reduction filter processing part 26 is described using a flowchart of FIG. 3. Note that, this flowchart is executed with the color difference signal Cr and color difference signal Cb, among the image signals subjected to the color conversion processing, being input to the color noise reduction filter processing part 26 as a trigger.

Step S101 is a process of calculating the saturation value C_in. The step S101 is executed by the ABS circuit 32. Since the color difference signal Cr_in and color difference signal Cb_in are input to the ABS circuit 32, the ABS circuit 32 calculates the saturation value C_in of each pixel using the color difference signal Cr_in and the color difference signal Cb_in. Note that the saturation value C_in is calculated using Formula (1) described above and the calculated saturation value C_in of each pixel is output to the correction operating circuits 34a, 34b, respectively.

Step S102 is the median filter processing. The color difference signal Cb_in is input to the median filter circuit 31a other than to the ABS circuit 32. Moreover, the color difference signal Cr_in is input to the median filter circuit 31b other than to the ABS circuit 32. The median filter circuits 31a, 31b respectively execute the median filter processing to an input color difference signal. Note that, if the color difference value of a pixel obtained from the color difference signal Cb_med subjected to the median filter processing by the median filter circuit 31a is denoted by $Cd_{Cb\_med}$, the color difference value $Cd_{Cb\_med}$ of this pixel is calculated by Formula (5).

$$Cd_{Cb\_med} = \mathrm{median}(Cd_{Cb\_in}) \quad (5)$$

Similarly, if the color difference value of a pixel obtained from the color difference signal Cr_med subjected to the median filter processing by the median filter circuit 31b is denoted by $Cd_{Cr\_med}$, the color difference value $Cd_{Cr\_med}$ of this pixel is calculated by Formula (6).

$$Cd_{Cr\_med} = \mathrm{median}(Cd_{Cr\_in}) \quad (6)$$

Note that, the color difference signal Cb_med after the median filter processing is output to the ABS circuit 33 and the correction operating circuit 34a. Moreover, the color difference signal Cr_med after the median filter processing is output to the ABS circuit 33 and the correction operating circuit 34b.

Step S103 is a process of calculating the saturation value C_med. Since the color difference signal Cb_med and color difference signal Cr_med after the median filter processing are input to the ABS circuit 33, respectively, the ABS circuit 33 calculates the saturation value C_med of each pixel using these color difference signals Cb_med, Cr_med. Note that, the saturation value C_med is calculated in Formula (2) described above. The saturation value C_med of each pixel calculated by Formula (2) is output to the correction operating circuits 34a, 34b, respectively.

Step S104 is the correction operation processing. To the correction operation circuit 34a, the saturation value C_in of each pixel calculated by the ABS circuit 32 is input and the saturation value C_med of each pixel calculated by the ABS circuit 33 is input. Moreover, other than this, the saturation signal Cb_med after the median filter processing is input to the ABS circuit 33. Using Formula (3), the correction operating circuit 34a corrects the color difference value $Cd_{Cb\_med}$ of each pixel obtained from the color difference signal Cb_med subjected to the median filter processing.

Similarly, to the correction operation circuit 34b, the saturation value C_in of each pixel calculated by the ABS circuit 32 is input and the saturation value C_med of each pixel calculated by the ABS circuit 33 is input. Moreover, other than this, the saturation signal Cr_med after the median filter processing is input to the correction operation circuit 34b. Using Formula (4), the correction operating circuit 34b corrects the color difference value $Cd_{Cr\_med}$ of each pixel obtained from the color difference signal Cr_med subjected to the median filter processing. Note that, the color difference signals corrected by these correction operating circuits 34a, 34b are input as the color difference signal Cb_out and color difference signal Cr_out, along with the luminance signal Y subjected to the edge processing, to the saturation emphasizing part 27 and then are output after being subjected to the saturation emphasizing processing. Note that an image signal after this saturation emphasizing processing is used in generating image data in a predetermined form, such as Jpeg.

Figure 4:
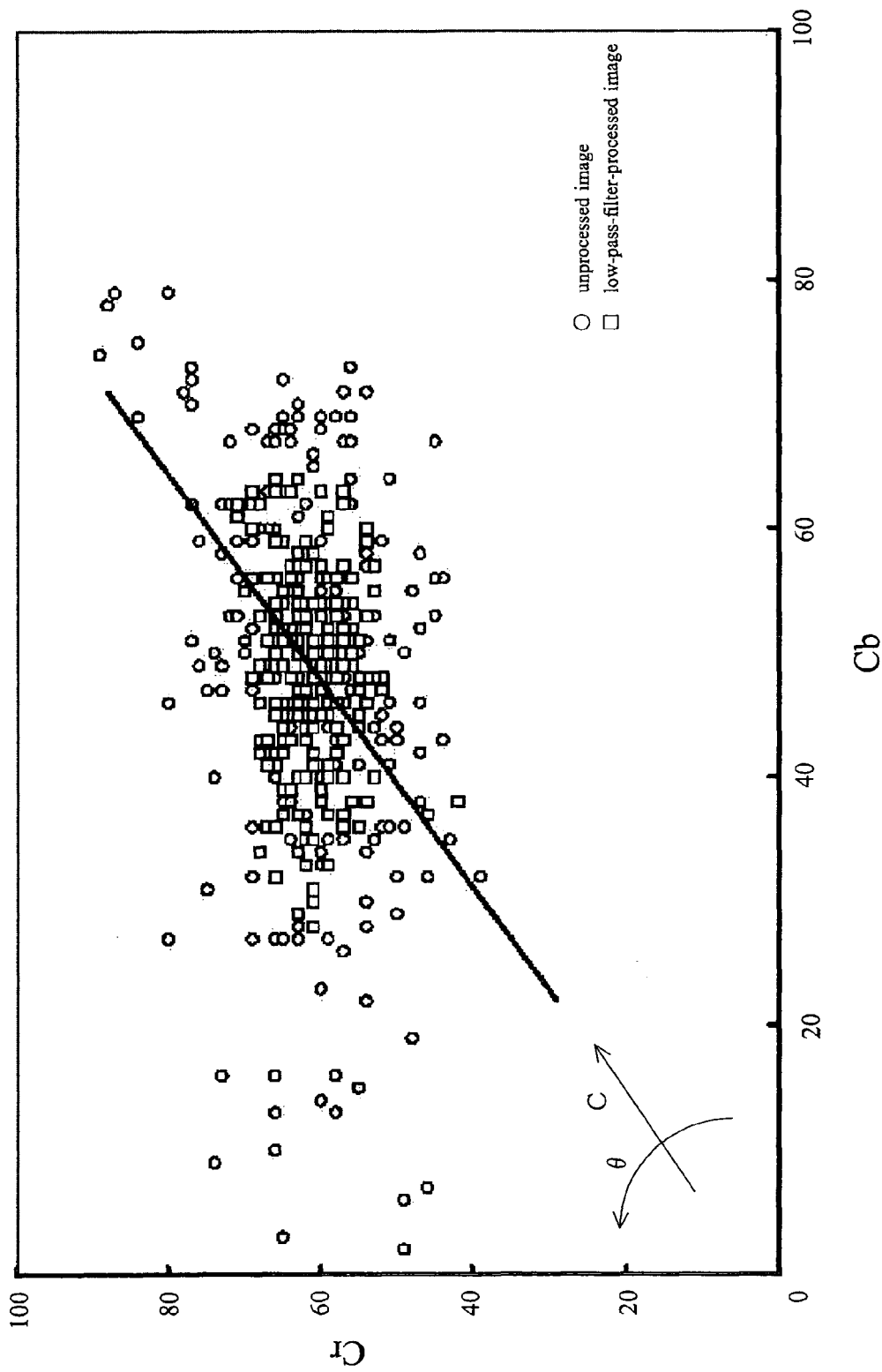
FIG. 4 shows a color difference distribution of each pixel in an image when a purple chart paper is photographed, and a color difference distribution of each pixel when LPF processing is performed on the image.

FIG. 4 shows a color difference distribution of each pixel in an image obtained when a purple chart paper is photographed, for example, and a color difference distribution of each pixel when LPF processing is performed on this image. Note that, the symbol of a circle shown in FIG. 4 represents a color difference of each pixel in an image that is not subjected to the LPF processing, i.e., an unprocessed image, while the symbol of a square represents a color difference of each pixel in an image after the LPF processing. With regard to the color difference of each pixel in an image obtained when the purple chart paper is photographed, the color difference value of each pixel disperses over a large range without concentrating on a predetermined color difference value in the obtained image due to the unevenness occurring in the surface of the chart paper, or the sensitivity characteristic, output characteristic, or the like of the image sensor 15. That is, a color noise, such as a washed-out color or a false color, is generated. In FIG. 4, in the unprocessed image, a deviation (devθ) in a hue angle (θ) direction is 22.8 and a deviation (devC) in a saturation (C) direction is 21.8, for example. If the LPF processing is performed on such an image, the deviation (devθ) in the hue angle direction becomes 9.2 and the deviation (devC) in the saturation (C) direction becomes 10.5. Since the color noise generated in the unprocessed image is reduced by performing the LPF processing, the deviation in the hue angle (θ) direction decreases and along with this the deviation in the saturation (C) direction will also decrease, i.e., the gradation of saturation will disappear. This is apparent from the fact that when a straight line shown in FIG. 4 is a straight line indicative of the saturation of the purple color, the color difference value of each pixel after the LPF processing distributes only in a specific range of the straight line indicative of the saturation of the purple color.

Figure 5:
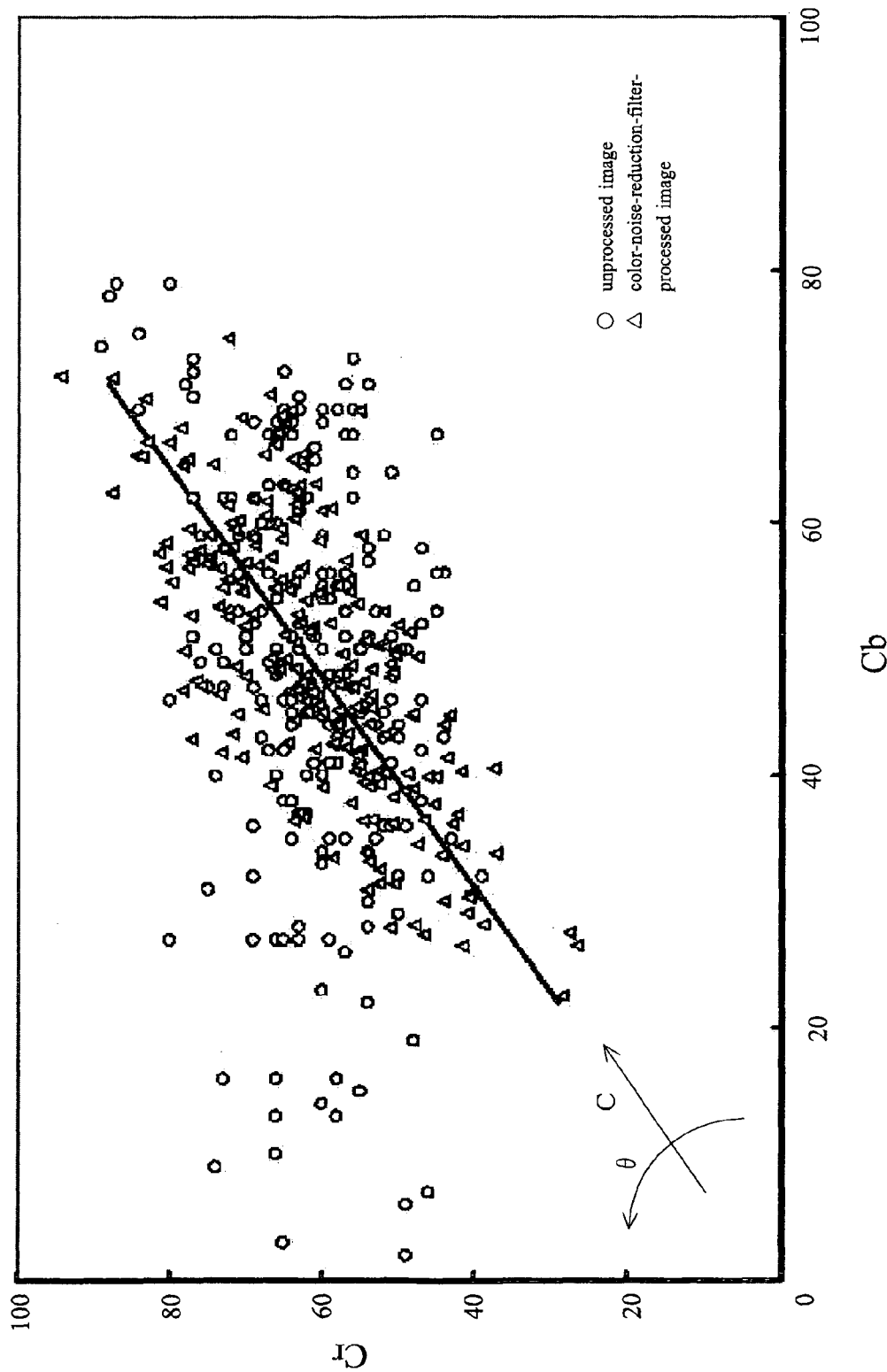
FIG. 5 shows a color difference distribution of each pixel in an image when a purple chart paper is photographed, and a color difference distribution of each pixel when a filtering processing using the noise reduction filter processing part is performed on the image.

FIG. 5 shows a color difference distribution in each pixel of an image used when preparing the color difference distribution shown in FIG. 4, and a color difference distribution when the filtering process by the color noise reduction filter processing part 26 of this embodiment is performed on this image. Note that, the symbol of a circle shown in FIG. 5 represents the color difference of each pixel in an unprocessed image while the symbol of a triangle represents the color difference of each pixel in the image after the filtering process. If the filtering process by the color noise reduction filter processing part 26 of this embodiment is performed, the deviation (devθ) in the hue angle (θ) direction becomes 10.5 and the deviation (devC) in the saturation (C) direction becomes 21.8. That is, if the filter processing by the color noise reduction filter processing part 26 is performed, the color noise generated in the unprocessed image is reduced and therefore the deviation in the hue angle (θ) direction decreases while the deviation in the saturation (C) direction will not vary before and after the filtering process, i.e., the gradation of saturation is maintained. This is apparent from the fact that when a straight line shown in FIG. 5 is a straight line indicative of the saturation of the purple color, the color difference value of each pixel after the color noise reduction filter processing distributes in a large range near this straight line in the saturation direction. That is, the image subjected to the filtering process by the color noise reduction filter processing part 26 of this embodiment turns into an image having the reduced color noise while maintaining the gradation of saturation.

In this embodiment, the saturation value C is calculated using Formula (1) or Formula (2) described above, however, the formula for calculating the saturation value C needs not to be limited to Formula (1) or Formula (2) and may be calculated from Formula (7) shown below. Note that, C represents a saturation value, $Cd_{Cb}$ represents a color difference value based on the color difference signal Cb, and $Cd_{Cr}$ represents a color difference value based on the color difference signal Cr.

$$C = \{(Cd_{Cb})^2 + (Cd_{Cr})^2\}^{1/2} \quad (7)$$

In this embodiment, in Step S101, the saturation of each pixel is calculated from an input image signal, however, the present invention is not limited thereto, and the saturation of each pixel may be calculated from an input image signal before performing the correction operation processing of Step S104. Note that, the saturation of each pixel calculated from an input image signal needs not be calculated with an image signal being input to the color noise reduction filter processing part as a trigger, and for example, when an amount of noise or a luminance value is calculated as an evaluation value in advance, such as in scene determination processing, noise reduction processing, or the like, this evaluation value may be input to the color noise reduction filter processing part. In this case, Step S101 shown in FIG. 3 can be omitted.

In this embodiment, as the configuration of the color noise reduction filter processing part, use of a median filter circuit has been described. However, for example, a rank filter circuit wherein a color difference value of an arbitrary rank, such as the second color difference value from the lowest color difference value, among the color difference values of pixels included in a specific area, is treated as a color difference value of a pixel at the center of this area, a mode value filtering circuit wherein a color difference value serving as a mode value among the color difference values of pixels included in a designated area is treated as a color difference value of a pixel at the central of this area, or the like may be used.

In this embodiment, a digital camera has been described as an example, however, the present invention is not limited thereto, and the color noise reduction filter processing part of the present embodiment can be used in image processing devices. Moreover, other than this, the present embodiment may be a noise reduction program for causing a computer to execute the functions of the color noise reduction filter processing part shown in the functional block diagram of FIG. 2 or the processings shown in the flowchart of FIG. 3. This noise reduction program may be incorporated as a part of an image processing program executable by a computer, or may be a program different from other programs. Note that this noise reduction program is preferably stored in a storage medium, such as a memory card, an optical disc, or a magnetic disc, that are readable by a computer.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. A noise reduction filter processing circuit, comprising: a first operating part calculating a saturation of an input image as first saturation information by adding an absolute value of a color difference obtained from the input image; a nonlinear processing part performing nonlinear processing on the input image using a median filter; a second operating part calculating a saturation of the input image subjected to the nonlinear processing as second saturation information; and a correction operating part performing a correction operation on the input image subjected to the nonlinear processing using the first saturation information and the second saturation information.

2. The noise reduction filter processing circuit according to claim 1, wherein
the second operating part calculates the second saturation information by adding an absolute value of a color difference obtained from the input image subjected to the nonlinear processing.

3. An image processing circuit comprising the noise reduction filter processing circuit according to claim 1.

4. An imaging device, comprising:
the image processing circuit according to claim 3;
an image sensor outputting an image signal based on received subject light; and
a color converting part converting color information obtained from the image signal into luminance information and color difference information.

5. A computer-readable storage medium storing a noise reduction program, causing a computer to execute: a first operating step calculating a saturation of an input image as first saturation information by adding an absolute value of a color difference obtained from the input image; a nonlinear processing step performing nonlinear processing on the input image using a median filter; a second operating step calculating a saturation of the input image subjected to the nonlinear processing as second saturation information; and a correction operating step performing a correction operation on the input image subjected to the nonlinear processing using the first saturation information and the second saturation information.

* * * * *